United States Patent [19]
McTaggart

[11] 3,715,472
[45] Feb. 6, 1973

[54] COLOR EMPHASIS CIRCUIT FOR TV RECEIVERS

[75] Inventor: James E. McTaggart, Malibu, Calif.

[73] Assignee: Teledyne, Inc., Los Angeles, Calif.

[22] Filed: Jan. 13, 1971

[21] Appl. No.: 106,096

[52] U.S. Cl. ....................178/5.4 HE
[51] Int. Cl. ....................H04n 9/12
[58] Field of Search ....................178/5.4, 5.4 HE

[56] References Cited

UNITED STATES PATENTS 3,525,802 8/1970 Whiteneir, Jr. ....................178/5.4 HE

*Primary Examiner*—Richard Murray
*Attorney*—Ronald W. Reagin, Ralph M. Braustein, Stephen L. King and Kenneth W. Mateer

[57] ABSTRACT

A circuit for enhancing a particular color in a color television receiver. A portion of the color signal is demodulated along the desired color axis, rectified and modulated with a phase controlled reference signal of like frequency. The signal so processed is added to the original color signal for normal demodulation. In a preferred version the color signal is applied through a diode to the base of a transistor having a threshold between the peak voltage appearing at the base with no color signal present and the peak voltage appearing at the base in the presence of a color signal in phase with the reference signal. The output signal of the transistor is then added back to the color signal to provide the enhanced color signal.

5 Claims, 9 Drawing Figures

J. E. Mc TAGGART
INVENTOR.
BY Ralph M Brumt
ATTORNEY

NORMAL

WITH FLESH TONE EMPHASIS

NORMAL

WITH FLESH TONE EMPHASIS

J.E. Mc TAGGART
INVENTOR.

BY Ralph M Braunt

ATTORNEY

J. E. Mc TAGGART
INVENTOR.
BY Ralph M Braunstein
ATTORNEY

J. E. Mc TAGGART
INVENTOR.
BY Ralph M Brown
ATTORNEY

COLOR EMPHASIS CIRCUIT FOR TV RECEIVERS

This invention relates to color television receivers and more particularly to a circuit for enhancing the brightness or luminence of a particular color.

In a color television receiver of the NTSC type, chroma information is received in the form of amplitude and phase modulation of a sub-carrier which is suppressed at the transmitter. The suppressed sub-carrier is reinserted by a local oscillator in the receiver. A reference for the demodulation of the chroma signal is provided by a few cycles of a color reference burst signal transmitted with each horizontal synchronizing pulse so that the local reference oscillator can be phase controlled with respect to the transmitter color reference oscillator to insure accurate signal demodulation.

Despite the accuracy of the demodulation, it may be desirable to enhance or emphasize a particular color, such as a flesh tone. In addition to minimizing the effect of transmission variances, such enhancement can also improve the subjective quality of the image and minimize the need for control adjustments on different channels, scenes or program sources.

It is an object of my invention to provide a simple and low cost system for enhancing or emphasizing a particular color in a color television receiver.

According to my invention, emphasis of a particular color is accomplished by demodulating the color signal to obtain information as to the intensity or saturation level of the desired hue, which information arrives at the receiver encoded as a phase modulation of the suppressed color sub-carrier at the transmitter. The demodulated envelope is rectified to eliminate that portion of the signal corresponding to the unwanted complementary color of the desired hue. A reference signal of the same frequency as the color sub-carrier is modulated with the demodulated and rectified color signal. The resulting enhancement signal is added to the original color signal prior to normal color demodulation. The color at which maximum enhancement results in controlled by varying the phase relation between the demodulated rectified color signal and the reference signal.

In one embodiment of my invention, demodulation, rectification and modulation as described above are achieved simultaneously in an extremely simple and low-cost circuit which uses one diode and one transistor to produce the desired enhancement signal.

The above and other objects as well as the features of my invention may be understood in the following more detailed description, drawing and claims. The same reference numerals are used to identify like elements in the several figures of the drawing.

Figure 4:
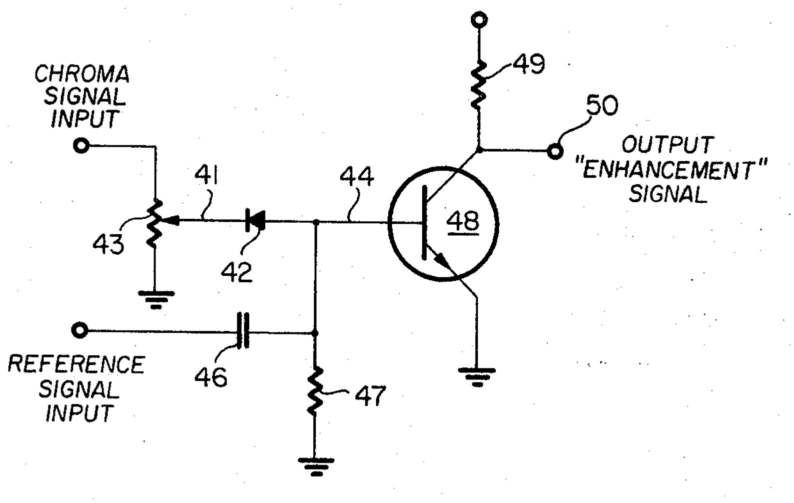
Figure 5:
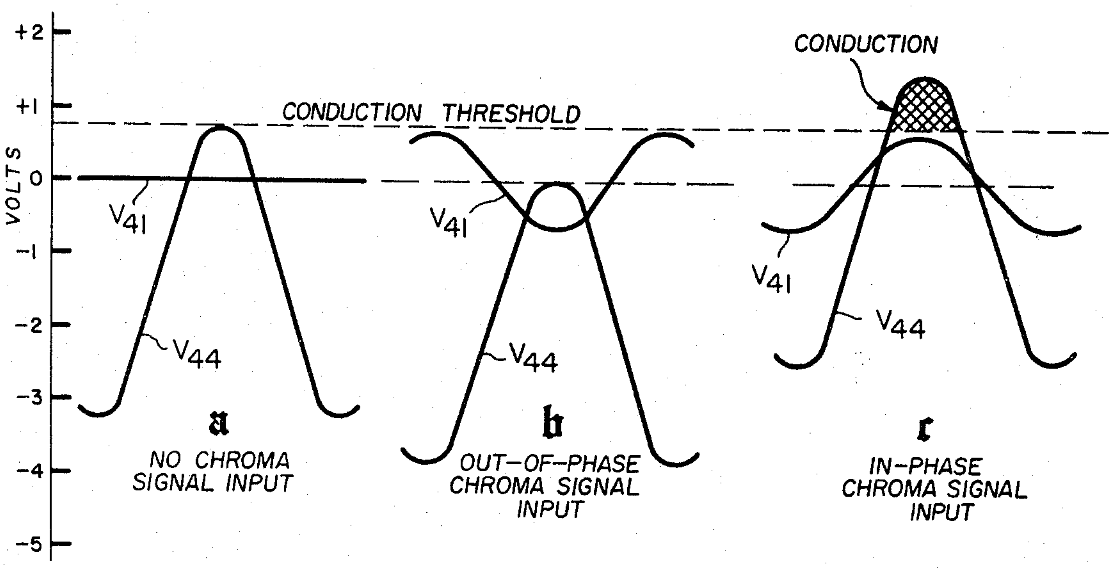
Figure 6:
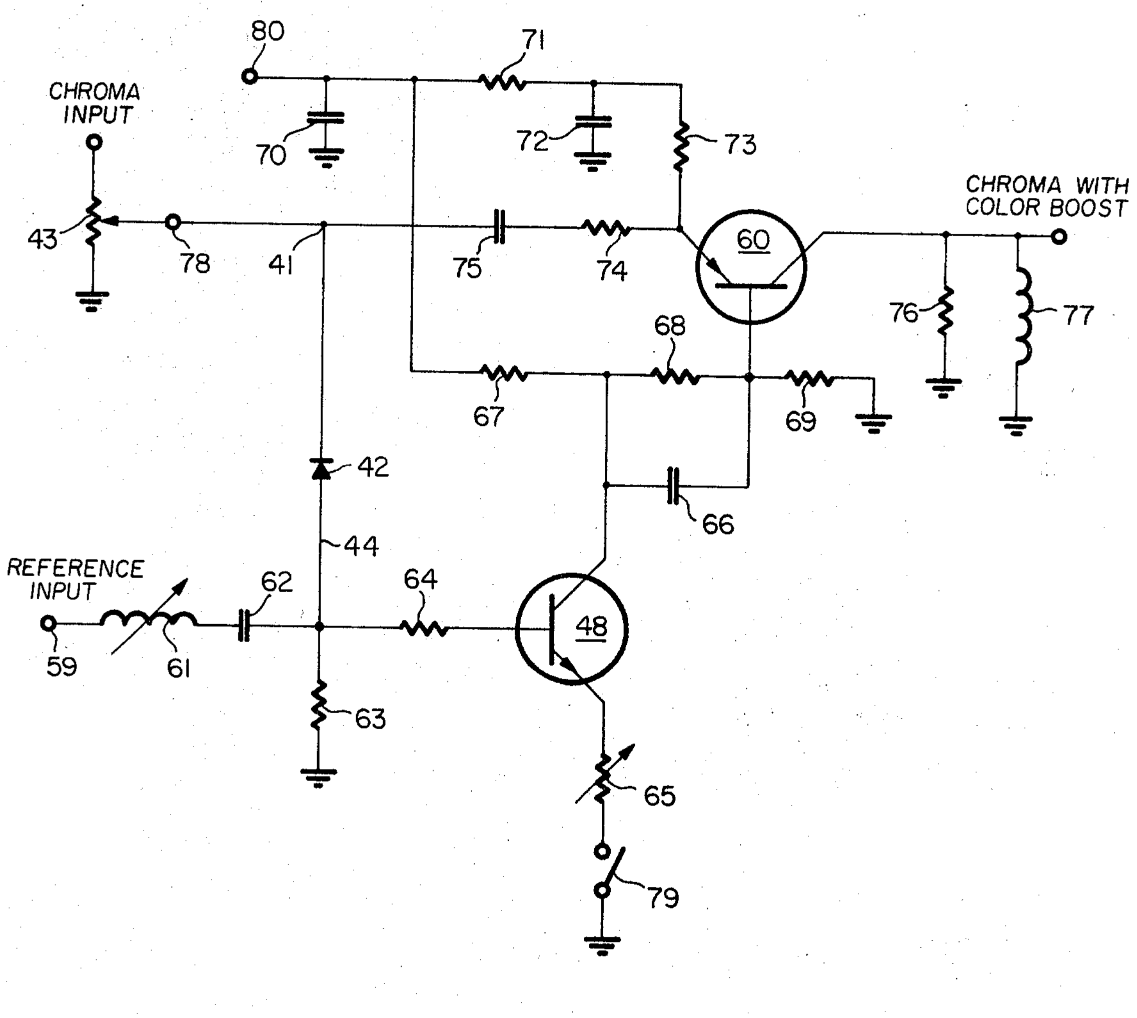

FIGS. 3(*a*), 3(*b*) 3(*c*) and 3(*d*) are color vector diagrams helpful in understanding the effect of the invention in a color television receiver;

FIG. 4 is a circuit diagram of a basic circuit of the invention;

FIG. 5 shows the voltage wave forms at selected points of the circuit shown in FIG. 4, under various operating conditions; and FIG. 6 is a schematic diagram of a more elaborate circuit embodying the invention.

Figure 1:
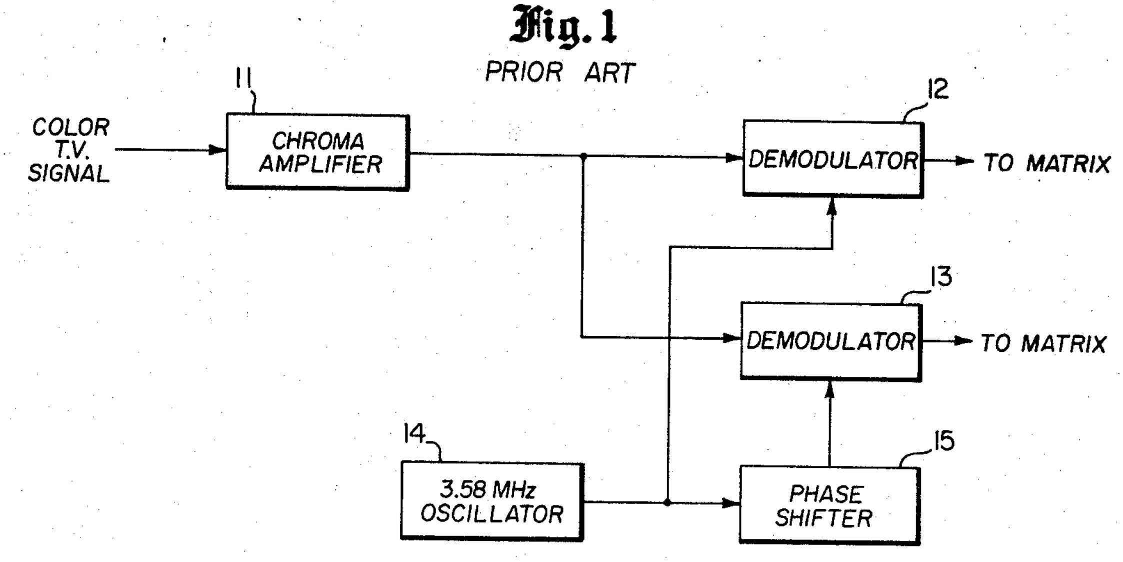
Fig. 1 PRIOR ART
FIG. 1 is a block diagram of the chroma processing section of a prior art color television receiver.

In the prior art chroma processing section shown in FIG. 1, the color television signal is fed to a chroma amplifier 11 and then to demodulators 12 and 13 for normal demodulation. In an NTSC receiver it is necessary to derive three distinct color control signals from the chroma information which is modulated on the color sub-carrier. The color difference signals are commonly referred to as R-Y, B-Y, and G-Y, where R, B, G represent respectively, the red, blue and green color signals and Y represents the luminence signal. Since the color control signals are inter-related, it is a common practice to demodulate only two of the signals at the receiver and then to matrix them in proper phase and magnitude to derive the third control signal.

The color information is modulated at the transmitter on a color sub-carrier which is 3.58 mHz higher in frequency than the picture carrier. As the 3.58 mHz sub-carrier is suppressed at the transmitter, it must be reinserted at the receiver in order to retrieve the color information. Short bursts of 3.58 mHz signal are transmitted to enable a local color sub-carrier oscillator 14 to synchronize with the color sub-carrier oscillator at the transmitter. The two color signals to be demodulated differ in phase, and a phase shifter 15 is provided to generate the phase shift appropriate to the selected color axes of demodulation.

Figure 2:
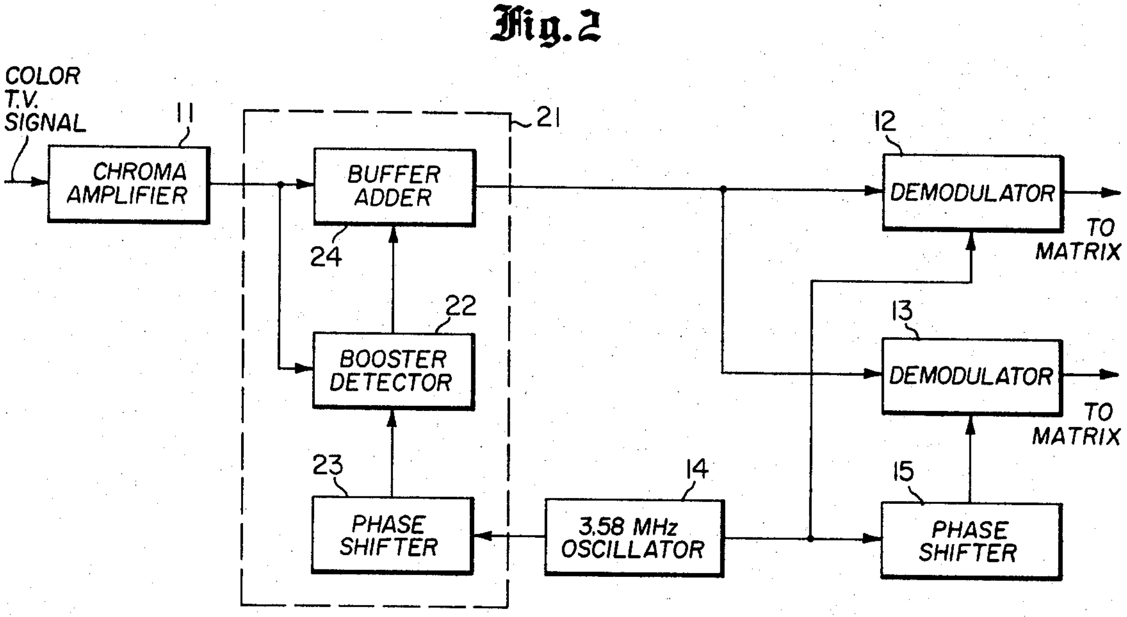
FIG. 2 is a block diagram of the chroma processing section of a color television receiver embodying the invention.

The block diagram shown in FIG. 2 includes a color emphasis section 21 between chroma amplifier 11 and demodulators 12 and 13. According to the invention color emphasis section 21 comprises a booster-detector 22, a phase shifter 23 and a buffer-adder 24. The signal from chroma amplifier 11 is applied to the buffer-adder 24 and to the booster-detector 22. A reference signal of like frequency to the color sub-carrier is supplied by oscillator 14 to phase shifter 23. In the booster-detector 22, the color signal is demodulated, rectified to eliminate that portion of the envelope which carries information relating to the complementary color of the color selected for enhancement, and modulated with the reference signal. The reference signal is phase controlled with respect to the color signal in accordance with the color for which maximum emphasis is desired. When the reference and color signals are in phase the enhancement signal is maximized. The enhancement signal is at a minimum when the reference and color signals are 180° out of phase. The enhancement signal which is generated in booster-detector 22 is applied to buffer-adder 24 where it is added to the original chroma signal. The sum of these two signals is then applied to demodulators 12 and 13 for normal demodulation.

The effect of color enhancement in accordance with the invention is illustrated in FIG. 3. FIG. 3*a* is a polar diagram of gain versus phase in a normal chroma amplifier without the color enhancement of my invention. The gain is the same at all phase angles. FIG. 3*b* is a polar-diagram of gain vs. phase in a color processing circuit employing color enhancement according to the invention. The enhancement in FIG. 3*b* amounts to 50 percent at an angle of 135° which corresponds to a flesh tone. The enhancement signal represented by vector $V_x$ is produced by booster-detector 22 and is added to the original color signal represented by vector $V_0$ in buffer-adder 24 to form a resultant vector $V_r$ which is effectively shifted in phase toward the flesh tone angle of 135° and is also increased in amplitude over $V_0$.

Figure 3A:
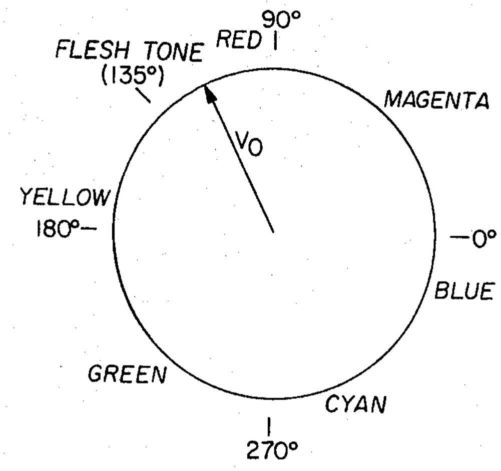
Figure 3B:
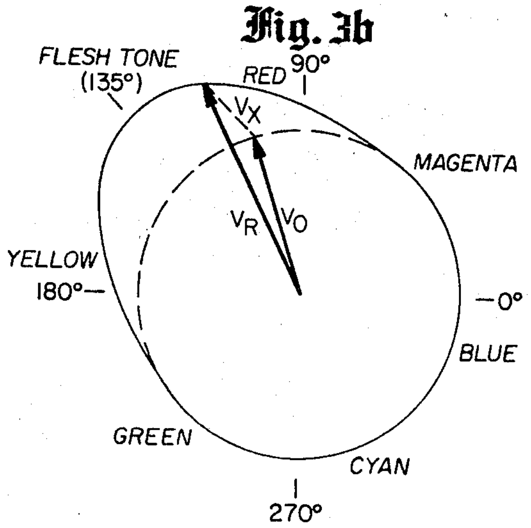
Figure 3C:
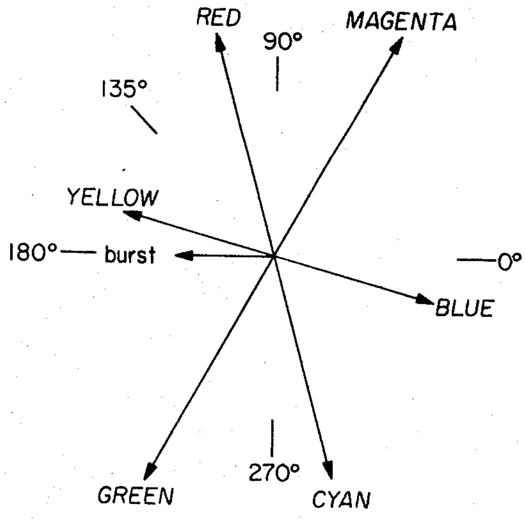
Figure 3D:
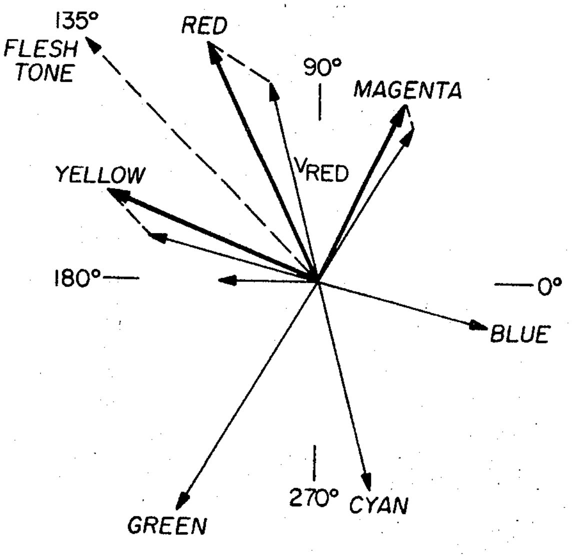

FIG. 3c is a color vector diagram showing the normal angles and magnitudes of magenta, blue, cyan, green, yellow, red and the reference burst in a standard color bar test pattern, while FIG. 3d illustrates the effect of enhancement of the original color signal at the flesh tone angle of 135°. It can be seen that the enhancement at 135° results not only in an increase in magnitude of the signal at that angle but an increase in magnitude as well as a shift in the red and yellow vectors toward the flesh tone angle. The original signal vector $V_0$ is thus effectively shifted toward the flesh tone angle and is increased over its original amplitude. In general, colors nearest the flesh tone angle are pulled most strongly toward it, while those further from 135° are less effected by the enhancement. Similar effects could be described for any other color selected for emphasis.

FIG. 4 is a diagram of a very simple low-cost basic circuit in which demodulation, rectification and color boost are achieved using a single diode and a single transistor. The chroma signal is applied to the terminal 41 of diode 42 across resistance 43. The demodulated and rectified signal appears at terminal 44 of diode 42, to which a reference signal of the same frequency, produced by a local oscillator in the receiver, is also coupled by way of capacitor 46 and resistance 47. The phase of the reference signal may be controlled by a phase shifting circuit to be the same as that of the chroma signal representing the color to be emphasized to produced maximum enhancement of the desired hue. The demodulated rectified color signal and the reference signal are applied together to the base of transistor 48 which is biased to provide a conduction threshold between the peak voltage of the reference signal and the sum of the peak voltages of the reference and color signals. Resistance 49 is provided in series with a bias source, not shown. The enhancement signal is derived from terminal 50 connected to the collector of transistor 48.

FIG. 5 depicts the voltage wave forms at points 41 and 44 of the circuit shown in FIG. 4 under various input voltage and phase conditions. In the family of curves labeled *a* in FIG. 5, there is no chroma signal and voltage $V_{41}$ at terminal 41 is zero while voltage $V_{44}$ at terminal 44 varies from −3.3 volts to +0.7 volts. The conduction threshold of transistor 48 is shown at +0.8 volts so that no current flows across transistor 48.

In the family of curves labeled *b* in FIG. 5, a chroma signal with peak voltage of plus or minus 0.7 volts is applied to terminal 41 of diode 42. As the chroma signal is 180° out of phase with the reference signal and thus represents a chroma signal of the complementary color to the color which is to be emphasized by the circuit, $V_{44}$ which is the resultant from the reference signal input and the demodulated and rectified chroma signal, is shifted in the negative direction and no current flows across transistor 48.

In the family of curves labeled *c* in FIG. 5, chroma and reference signals are in phase with the chroma signal now representing the color to be emphasized, and the resultant of these voltages is greater than the conduction threshold of transistor 48, which therefore conducts at the peak and during a part of each voltage cycle near the peak. Pulses of base and collector current then flow in phase with the reference signal and have an amplitude determined by the amplitude of the incoming chroma signal. These current pulses provide the desired enhancement signal.

Chroma signals having a phase angle close to that of the reference signal, that is chroma signals representing color close to the color to be emphasized, also produce output pulses in transistor 48 but their amplitude is reduced by the cosine of the angle of the phase difference between the chroma and reference signals, being zero at plus or minus 90°. Beyond plus or minus 90° there is no conduction from transistor 48, as is illustrated by the family of curves labeled *b* in FIG. 5.

In the circuit shown in FIG. 4, diode 42 and transistor 48 are connected so that the forward voltage drop of diode 42 is balanced against the forward base-emitter junction voltage drop of transistor 48. This results in automatic temperature compensation of the threshold bias and eliminates the need for a separate regulated temperature compensated power supply to maintain an accurate threshold bias on transistor 48.

FIG. 6 is a schematic diagram of a more elaborate circuit embodying the invention. In the circuit shown in FIG. 6, a chroma signal input is regulated by a color gain control 78 employing a variable resistor 43. The chroma signal is applied to diode 42 and to a unity gain non-inverting buffer stage employing a single transistor 60 in the chroma channel. The chroma signal is demodulated and rectified by diode 42 and combined with a reference signal applied to terminal 44 across a phase shifting circuit comprising inductance 61, capacitance 62 and resistance 63. The phase shifting circuit shifts the phase of the reference signal to the desired phase angle with respect to the reference signal applied to the normal color demodulators. Inductance 61, capacitance 62 and resistance 63 may in an actual TV receiver have fixed values with sufficiently close tolerances to provide the desired hue enhancement or, alternatively, adjustable elements may be provided to permit the viewer or the service technician to control the angle of the enhancement signal, i.e., to select the hue at which maximum emphasis is to be provided.

In the circuit embodying the invention the phase angle of the enhancement signal and the hue which receives the maximum boost are determined entirely by constants within the television receiver. These characteristics are not affected by errors or variations in a received signal. However, the amplitude of the enhancement signal, which controls the saturation or intensity of the resultant flesh tone, is derived from the received signal. For this reason, it is desirable to provide the viewer with means for controlling the degree of enhancement or boost. In FIG. 6 this may be accomplished by making emitter resistor 65 of transistor 48 variable. In addition, a switch 79 is provided in the emitter circuit of transistor 48 so that the color booster circuit may be disabled to provide normal reception.

In actual operation of the circuit shown in FIG. 6 a chroma signal having an amplitude of 2 volts peak to peak was applied across resistance 43 and a reference signal having an amplitude of 2.7 volts peak to peak was applied to terminal 59. The reference signal phase angle was 195° with respect to the reference signal applied to the normal color demodulators and was shifted to 135°, the flesh tone angle, by the phase shift network comprising inductance 61, capacitance 62 and resistance 63. A bias of plus 25 volts was applied to terminal 80 with the other circuit elements having values as shown in TABLE I. Color signal enhancement at the flesh tone angle was obtained as described in this specification.

TABLE I

| | | | |
|---|---|---|---|
| 43 | 500 ohms | 68 | 27,000 ohms |
| 48 | Si NPN | 69 | 22,000 ohms |
| 60 | Si PNP | 70 | 0.01 mmF |
| 61 | 120 mmH | 71 | 2,200 ohms |
| 62 | 47 p F | 72 | 0.01 mmF |
| 63 | 8,200 ohms | 73 | 330 ohms |
| 64 | 470 ohms | 74 | 330 ohms |
| 65 | 100 ohms | 75 | 0.01 mmF |
| 66 | 0.01 mmF | 76 | 470 ohms |
| 67 | 270 ohms | 77 | 39 mmH |

The specific embodiments described in this specification illustrate the principle of the invention, which may be modified by those skilled in the art without departing from their scope and spirit.

What is claimed is:

1. In a color television receiver, a circuit for emphasizing a particular color comprising:

a diode having first and second terminals;

means for applying a color signal to the first terminal of the diode for demodulation and rectification;

means for receiving from the second terminal of the diode the demodulated rectified color signal;

means for combining a reference signal of like frequency and desired phase with the demodulated rectified color signal;

a transistor having a conduction threshold between the peak voltage of the referenced signal and the sum of the peak voltages of the reference signal and the demodulated rectified color signal;

means for applying the combined reference and demodulated rectified color signals to the base of the transistor, and means for deriving a color enhancement signal from the transistor.

2. A circuit as in claim 1 wherein the forward voltage drop across the diode is balanced against the forward voltage drop across the base emitter junction of the transistor to provide automatic temperature compensation to the transistor threshold bias.

3. A circuit as in claim 1 and further comprising means for varying the phase relation between the demodulated rectified color signal and the reference signal.

4. A circuit as in claim 3 and further comprising means for adding signals, means for applying to the signal adding means the color signal and the color enhancement signal, and means for deriving from the signal adding means a signal corresponding to the sum of the signals applied.

5. In a color television receiver, a circuit for emphasizing a particular color comprising:

means for demodulating and rectifying a color sub-carrier signal along a desired axis corresponding to the color to be emphasized;

means for producing a reference signal having the same frequency as said color sub-carrier and having a phase corresponding to the color to be emphasized;

means for modulating the reference signal with the demodulated and rectified color sub-carrier to produce a color enhancement signal; and means for adding the color enhancement signal to the color sub-carrier signal to produce a color enhanced signal for demodulation.

* * * * *